(12) United States Patent
Sakamoto

(10) Patent No.: US 9,011,567 B2
(45) Date of Patent: Apr. 21, 2015

(54) SPUNBONDED NONWOVEN FABRIC AND FILTER USING SAME

(75) Inventor: Hiroyuki Sakamoto, Shiga (JP)

(73) Assignee: Toyobo Co., Ltd., Osaka (JP)

( * ) Notice: Subject to any disclaimer, the term of this patent is extended or adjusted under 35 U.S.C. 154(b) by 0 days.

(21) Appl. No.: 13/808,176

(22) PCT Filed: Dec. 10, 2010

(86) PCT No.: PCT/JP2010/072206
§ 371 (c)(1),
(2), (4) Date: Jan. 3, 2013

(87) PCT Pub. No.: WO2012/004905
PCT Pub. Date: Jan. 12, 2012

(65) Prior Publication Data
US 2013/0111861 A1 May 9, 2013

(30) Foreign Application Priority Data
Jul. 6, 2010 (JP) ................................ 2010-153701

(51) Int. Cl.
*B01D 50/00* (2006.01)
*B01D 39/16* (2006.01)
(Continued)

(52) U.S. Cl.
CPC .......... *B01D 39/163* (2013.01); *B01D 2239/10* (2013.01); *B01D 2239/1291* (2013.01); *D04H 3/011* (2013.01); *D04H 1/4382* (2013.01); *D04H 1/541* (2013.01)

(58) Field of Classification Search
CPC ................. D04H 1/51; B01D 2239/10; B01D 2239/1291

USPC .............................. 55/500, 528; 428/181, 219
See application file for complete search history.

(56) References Cited

U.S. PATENT DOCUMENTS 6,485,811 B1   11/2002   Horiguchi et al.
8,187,520 B2   5/2012    Takano et al.
(Continued)

FOREIGN PATENT DOCUMENTS

JP   62-144723   6/1987
JP   60-47219    2/1994
(Continued)

OTHER PUBLICATIONS

Japanese Patent Office, International Search Report for International Patent Appln. No. PCT/JP2010/07206 (Feb. 15, 2011).

*Primary Examiner* — Jason M Greene
*Assistant Examiner* — Karla Hawkins
(74) *Attorney, Agent, or Firm* — Fish & Richardson P.C.

(57) ABSTRACT

The purpose of the present invention is to obtain a spunbonded nonwoven fabric, which comprises a single-component polyester-based fibers, having a high basis weight and a high rigidity by embossing, which is difficult to attain in the conventional art. Further, the present invention provides a filter base material having excellent pleatability, pleat retention property and durability, and a filter using thereof. The present spunbonded nonwoven fabric is obtained by subjecting a deposited fiber assembly to a thermocompression bonding by embossing with a pair of an embossing roll and a flat metal roll, and has a basis weight of 150 to 400 $g/m^2$, a longitudinal bending repulsion of 20 to 60 mN and a longitudinal tensile strength of 400 N/5 cm or more.

16 Claims, No Drawings

(51) Int. Cl.
*D04H 3/011* (2012.01)
*D04H 1/4382* (2012.01)
*D04H 1/541* (2012.01)

(56) References Cited

U.S. PATENT DOCUMENTS

| | | | |
|---|---|---|---|
| 8,308,833 B2 | 11/2012 | Takano et al. | |
| 2003/0089442 A1 | 5/2003 | Pfeuffer | |
| 2003/0209305 A1* | 11/2003 | Smith et al. | 156/71 |
| 2009/0324895 A1* | 12/2009 | Takano et al. | 428/181 |
| 2010/0146921 A1 | 6/2010 | Takano et al. | |

FOREIGN PATENT DOCUMENTS

| | | |
|---|---|---|
| JP | 8-100371 | 4/1996 |
| JP | 09-192426 | 7/1997 |
| JP | 10-099608 | 4/1998 |
| JP | 11-061568 | 3/1999 |
| JP | 11-192406 | 7/1999 |
| JP | 11-253718 | 9/1999 |
| JP | 2001-54709 | 2/2001 |
| JP | 2001-123325 | 5/2001 |
| JP | 2001-248056 | 9/2001 |
| JP | 2001-271260 | 10/2001 |
| JP | 2001-276529 | 10/2001 |
| JP | 2005-007268 | 1/2005 |
| JP | 2005-111337 | 4/2005 |
| JP | 2007-125546 | 5/2007 |
| JP | 2007-231500 | 9/2007 |
| JP | 2007-237167 | 9/2007 |

* cited by examiner

SPUNBONDED NONWOVEN FABRIC AND FILTER USING SAME

TECHNICAL FIELD

The present invention relates to a spunbonded nonwoven fabric and a filter using the same. More particularly, the present invention relates to a spunbonded nonwoven fabric with high rigidity for a filter base material having excellent molding processability and shape retention durability and a filter excellent in collection performance using the spunbonded nonwoven fabric as a filter base material.

BACKGROUND ART

Conventionally, an air filter, e.g., a dust collector filter or the like, has been used widely for improving the labor environments in factories such as metal cutting factories or factories where powder dust is generated in a large amount, or for recovering relatively expensive powder. A polyester filament nonwoven fabric, which serves as a general-purpose polyester filament nonwoven fabric, and a polyester staple nonwoven fabric have been used as a filter base material thereof.

A bag filter obtained by sewing and forming a nonwoven fabric produced from staple fibers as a raw material into a cylindrical shape has been used so far as a filter base material for a dust collector; however in order to obtain sufficient filtration throughput, the cylindrical bag filter inevitably requires enlargement. Accordingly, in order to save the space and widen the filtration surface area, a filter using a pleated nonwoven fabric as a filter base material has been used. For this pleated-type filter, a nonwoven fabric with high rigidity is required so as to bear a load during filtration.

In order to obtain a nonwoven fabric with high rigidity, it is necessary to heighten the cross-sectional shape moment of the nonwoven fabric, that is, to make the thickness of the nonwoven fabric large. However, when the thickness is made large while lowering the fiber density, the network structure of the fibers is coarse, so that rigidity is not exerted. Consequently, a technique for making the thickness large by increasing its basis weight has been employed.

Regarding a polyester filament nonwoven fabric, in the case of using fibers in an oriented crystallization state by high speed spinning, a high basis weight causes insufficient fiber fusion by embossing, low elongation, high rigidity and insufficient moldability, so that there is a problem of deterioration in shape retention property.

Accordingly, in order to improve the fiber fusion property, there is proposed a method in which undrawn yarns that are not subjected to oriented crystallization are used as a thermobonding component, followed by embossing (e.g., see Patent Literature 1). However, in this method, since crystallization is promoted for fibers with low orientation degree by embossing, the fibers become brittle and there is a problem of deterioration in shape retention property and durability.

As a method for improving the rigidity and pleat retention property of a nonwoven fabric, there are proposed many methods using thermobonding components. There are proposed methods embossing a sheath-core type composite filament nonwoven fabric containing the low melting point component as a sheath component by compression bonding to form a shallow unevenness and suppress fuzz, thereby obtaining a nonwoven fabric having a bending resistance of 500 mg or more and a good pleat retention property (e.g., see Patent Literatures 2 and 3).

There is proposed a method for forming a shallow unevenness by compression bonding, through embossing, a low melting point component of a filament nonwoven fabric containing the low melting point component as a sheath component and defining a basis weight and bending resistance (e.g., see Patent Literature 4). Further, there is proposed a method of integrating a filament layer containing a low melting point component as a sheath component and a layer obtained by mixing a filament containing a low melting point component and a filament containing a high melting point component, subjecting the stacked material to embossing, and further adjusting the thickness thereof by calendering (e.g., see Patent Literature 5). There is proposed a method for improving pleatability and pleat retention property by mixing thick composite fibers containing a low melting point component and thin fibers in order to decrease a thermobonding component, subjecting the mixed fibers to embossing, and constituting a frame function with the thick thermobonding fibers (e.g., see Patent Literature 6). As a method for decreasing a bonding component, there are also proposed many methods using petal parts of those having petal type cross sections as thermobonding components (e.g., see Patent Literatures 7 to 12). These methods have a problem of deterioration in durability caused by relaxation attributed to the glass transition temperature of the low melting point component.

As a different method for obtaining a nonwoven fabric with high rigidity, there is proposed a method for three-dimensionally interlacing a filament nonwoven fabric containing no low melting point component by needle punching, impregnating the nonwoven fabric with a binder resin, and fixing the crossing points of the fibers with the resin (e.g., see Patent Literature 13). This method improves rigidity, but has problems that the filtration performance is lowered because of pores by needle punching and further that the binder resin is dropped from the crossing points by outside force during pleating or repetitive use.

As described above, there are proposed methods for improving pleatability or enhancing pleat retention property while keeping the filter performance; however, a problem for obtain a nonwoven fabric with high rigidity that is suitable as a filter having a pleat retention property and durability even in a heating atmosphere has not been yet solved.

CITATION LIST

Patent Literature

Patent Literature 1: Japanese Unexamined Patent Application Publication No. H10-99608
Patent Literature 2: Japanese Unexamined Patent Application Publication No. H9-192426
Patent Literature 3: Japanese Unexamined Patent Application Publication No. H11-253718
Patent Literature 4: Japanese Unexamined Patent Application Publication No. 2001-54709
Patent Literature 5: Japanese Unexamined Patent Application Publication No. H8-100371
Patent Literature 6: Japanese Unexamined Patent Application Publication No. H11-192406
Patent Literature 7: Japanese Unexamined Patent Application Publication No. 2001-248056
Patent Literature 8: Japanese Unexamined Patent Application Publication No. 2001-276529
Patent Literature 9: Japanese Unexamined Patent Application Publication No. 2001-271260
Patent Literature 10: Japanese Unexamined Patent Application Publication No. 2005-7268
Patent Literature 11: Japanese Unexamined Patent Application Publication No. 2005-111337

Patent Literature 12: Japanese Unexamined Patent Application Publication No. 2007-125546

Patent Literature 13: Japanese Unexamined Patent Application Publication No. H6-47219

SUMMARY OF INVENTION

Problem to be Solved by the Invention

The present invention has been made in view of the problems of conventional techniques. That is, an object of the present invention is to provide a spunbonded nonwoven fabric with high rigidity having excellent molding processability and shape retention durability. Another object of the present invention is to provide a filter base material and a filter each using the spunbonded nonwoven fabric with high rigidity.

Solutions to the Problems

The inventor of the present invention has intensively studied, and as a result, found that the above problems could be solved by the following means, and thus the present invention has been completed. That is, the present invention is configured as follows.

1. A spunbonded nonwoven fabric having a basis weight of 150 to 400 g/m$^2$, a longitudinal bending repulsion of 20 to 60 mN, and a longitudinal tensile strength of 400 N/5 cm or more, which is obtained by subjecting a deposited fiber assembly that comprises single-component polyester-based fibers to thermocompression bonding using an embossing roll and a flat metal roll.
2. The spunbonded nonwoven fabric according to the above mentioned aspect 1, wherein the polyester-based fibers are fibers made of a mixture containing 98.0 to 99.95 wt % of a polyester-based resin A (A component) having a glass transition temperature of 60° C. or higher and 0.05 to 2.0 wt % of a thermoplastic resin (B component) incompatible with the polyester-based resin (A component) and having a glass transition temperature of 120° C. to 160° C.
3. The spunbonded nonwoven fabric according to the above mentioned aspect 1 or 2, wherein the A component is polyethylene terephthalate and the B component is a styrene-methyl methacrylate-maleic anhydride copolymer or a styrene-maleic acid copolymer.
4. The spunbonded nonwoven fabric according to any of the above mentioned aspects 1 to 3, wherein the fibers constituting the nonwoven fabric are long fibers each having a birefringence of 0.04 to 0.09 and a fineness of 1 to 5 dtex.
5. A filter base material obtained by using the spunbonded nonwoven fabric according to any of the above mentioned aspects 1 to 4.
6. A filter base material obtained by using the spunbonded nonwoven fabric according to any of the above mentioned aspects 1 to 4, the filter base material having a collection efficiency of 25% or more for particles with a size of 0.3 μm or more and 0.5 μm or less and a QF value of 0.03 mmAq$^{-1}$ or more, regarding a filtration property when being used in the form of a nonwoven fiber single-plate.
7. The filter base material according to the above mentioned aspect 5 or 6, which is subjected to pleating.
8. A filter obtained by using the filter base material according to any of the above mentioned aspects 5 to 7.

Advantageous Effect of the Invention

A nonwoven fabric with high rigidity that is suitable as a filter base material is obtained by the present invention. Owing to the rigidity, the nonwoven fabric with high rigidity can provide a filter base material having good pleatability and excellent bending durability and pleat retention property after being pleated.

DESCRIPTION OF EMBODIMENT

Hereinafter, the present invention will be described in detail.

The nonwoven fabric of the present invention is a spunbonded nonwoven fabric that comprises single-component polyester-based fibers. Herein, the single-component polyester-based fibers mean that the polyester-based fibers constituting the nonwoven fabric are not composite fibers such as sheath-core type or side-by-side type composite fibers, but are fibers obtained by extruding one kind polyester-based resin from a nozzle without making composites of the resin. As the one kind polyester-based resin, not only homopolymers but also polymer blends formed into fibers without making composites may be included in the single-component polyester fibers of the present invention.

The spunbonded nonwoven fabric of the present invention has a basis weight of 150 to 400 g/m$^2$, preferably 180 to 350 g/m$^2$, and further preferably 200 to 300 g/m$^2$. If it is lower than 150 g/m$^2$, the bending rigidity is lowered and in the case of using such a spunbonded nonwoven fabric for a filter, when a load is increased on the nonwoven fabric because of deposition of filtrated particles, the filter material is deformed due to the load to form folding lines and it results in problems of a decrease in filtration surface area and shortening in its life. If it exceeds 400 g/m$^2$, improvement in filtration precision due to an increase in fiber amount is scarcely observed, and the increase in fiber amount leads to an increase in product weight and an increase in production cost and therefore, it is not preferable. Further owing to high rigidity, pleatability may be lowered and therefore, it is not also preferable.

The spunbonded nonwoven fabric of the present invention has a longitudinal bending repulsion of 20 to 60 mN, preferably 30 to 50 mN, and more preferably 35 to 45 mN. If it is lower than 20 mN, a pleat retention property is lowered and therefore, it is not preferable. If it exceeds 60 mN, the folding resistance during pleating is increased and the finishing states of unevenness points in a pleated shape may not be sharp and therefore, it is not preferable. Additionally, the bending repulsion in the longitudinal direction that is a folding direction dominates the pleat retention property and the transverse bending repulsion is not particularly limited, however, the transverse bending repulsion is 10 mN or more, and preferably 15 mN or more.

The spunbonded nonwoven fabric of the present invention has a longitudinal tensile strength of 400 N/5 cm or more, preferably 450 N/5 cm or more, and more preferably 500 N/5 cm or more. If it is lower than 400 N/5 cm, in the case of using the nonwoven fabric as a filter, when powder dust is deposited and the filter base material bears a load, it results in a risk of causing sheet breakage and therefore, it is not preferable. The upper limit of the tensile strength is not particularly limited since it can be adjusted by adjustment of compression bonding surface area or processing temperature, but in terms of the balance with the other properties of nonwoven fabrics, it is about 1000 N/5 cm or lower.

The spunbonded nonwoven fabric of the present invention is preferable to be constituted from polyester-based fibers using, as a raw material, a mixture containing 98.0 to 99.95% by weight of a polyester-based resin (A component) having a glass transition temperature of 60° C. or higher and 0.05 to 2.0% by weight of a thermoplastic resin (B component) incompatible with the polyester-based resin (A component) and having a glass temperature of 120° C. to 160° C.

Example of the polyester-based resin (A component) having a glass transition temperature of 60° C. or higher include polyethylene terephthalate (PET), polyethylene naphthalate (PEN), and polycyclohexane dimethyl terephthalate (PCHT) and the like. In the case of a polyester-based resin having a glass transition temperature of lower than 60° C., the thermal relaxation of the nonwoven fabric to be obtained becomes significant and when such a nonwoven fabric is used as a filter, the heat resistance is inferior and therefore, it is not preferable.

Regarding the polyester-based resin (A component), a copolymer polyester resin may be contained so as to have a glass transition temperature to 60° C. or higher, and the content of a homopolyester resin component is preferably 99 mol % or more, and further preferably 100% or more. To an extent that the properties are not deteriorated in the present invention, modifiers such as an antioxidant, an ultraviolet absorbent, a coloring agent, a flame retardant, and an antibacterial agent may be added.

The thermoplastic resin (B component) incompatible with the polyester-based resin (A component) and having a glass transition temperature of 120° C. to 160° C. in the present invention has a property such that the B component has no compatibility with the polyester-based resin (A) and the B component is present as an independent component when the polyester-based resin (A component) is melted. Since having a glass transition temperature at least 40° C. higher than the glass transition temperature of the polyester-based resin (A component), the B component serving as an independent component is effective to suppress the polyester-based resin (A component) to be in an oriented crystallization state when receiving spinning tensile force. Examples of the B component include polystyrene-based resins, polyacrylate-based resins, methyl pentene-based resins, and their copolymers and the like. Additionally, the fibers to be obtained contain the B components present, as independent components, in the A components in a dispersion manner and are thus different from composite fibers that are generally called sea-island fibers containing island components present in sea components continuously in the longitudinal direction. That is, obtained are single-component fibers that are not composite fibers and contain the B components present, as independent components, in the A components, which serve as a main component, in a dispersion manner.

The B component preferably has a glass transition temperature of 120° C. to 160° C. If it is lower than 120° C., the orientation suppression effect becomes insignificant and it is required to increase the addition amount thereof in order to obtain desired properties of the nonwoven fabric; however, an increase in addition amount causes a tendency of yarn breakage during high speed spinning and therefore, it is not preferable. If it is higher than 160° C., the thinning speed becomes high and yarn breakage tends to occur during high speed spinning and therefore, it is not preferable.

As the B component in the present invention, a styrene-acrylate-based copolymer is preferable and in the case of using polyethylene terephthalate (PET) as the A component, a styrene-methyl methacrylate-maleic anhydride copolymer having a glass transition temperature of 122° C. (e.g., as a commercialized product, PLEXIGLAS HW55 manufactured by Rohm GmbH & Co. KG) is particularly preferable since it has a high effect of suppressing oriented crystallization by a small amount of addition. In the case of using polyethylene naphthalate (PEN) as the A component, a styrene-maleic anhydride copolymer having a glass transition temperature of 155° C. (e.g., as a commercialized product, SMA 1000 manufactured by SARTOMER Company Inc.) is preferable to be used.

The content of the B component is preferably 0.05 to 2% by weight, more preferably 0.1 to 1.5% by weight, and further preferably 0.2 to 1.0% by weight. If the content is lower than 0.05% by weight, the effect of suppressing oriented crystallization is lowered and the fiber fusion by embossing becomes insufficient and therefore, it is not preferable. If the content exceeds 2% by weight, yarn breakage in a high speed spinning range tends to occur and it is difficult to provide stable production and therefore, it is not preferable. Although the yarn breakage is improved by lowering the spinning speed, but the birefringence, which is one of requirements for the present invention, becomes unsatisfactory and durability becomes inferior and therefore, it is not preferable.

The nonwoven fabric of the present invention is a filament nonwoven fabric obtained by a spun bonding method, and it is a nonwoven fabric which is obtained by subjecting a deposited fiber assembly that comprises a single-component polyester-based fibers to thermocompression bonding by embossing using a pair of rolls, namely, an embossing roll and a flat metal roll. Use of a mixture of the above-mentioned A component and B component as a raw material for the single-component polyester-based resin makes it possible to obtain a spunbonded nonwoven fabric having high rigidity and a high basis weight of 150 to 400 g/m$^2$, which is conventionally achieved by using sheath-core type composite fibers including a low melting point component as a sheath component and a high melting point component as a core component and further subjecting the composite fibers to both-sides embossing using a pair of embossing rolls.

That is, in the case of producing a spunbonded nonwoven fabric having a high basis weight of 150 to 400 g/m$^2$ from a single-component polyester-based resin, the thermocompression bonding by embossing has been defective so far because of the high basis weight and merely a nonwoven fabric which may cause interlayer peeling is obtained; that is, merely a nonwoven fabric with low rigidity and a longitudinal bending repulsion of lower than 20 mN is obtained. In contrast, regarding the nonwoven fabric of the present invention, use of polyester-based fibers made of a mixture of the above-mentioned A component and B component makes it possible to obtain a deposited fiber assembly that is easily subjected to thermocompression bonding. The spunbonded nonwoven fabric having a high basis weight of 150 to 400 g/m$^2$ can be sufficiently thermocompression bonded by subjecting the deposited fiber assembly to thermocompression bonding using a pair of rolls, namely, an embossing roll and a flat metal roll, but not subjecting to thermocompression bonding using a pair of embossing rolls. As a result, the spunbonded nonwoven fabric obtained is a nonwoven fabric with high rigidity and excellent longitudinal bending repulsion.

Regarding the nonwoven fabric of the present invention, a staple nonwoven fabric is not preferable since the tensile strength of the nonwoven fabric is weak and the rigidity is low. A staple nonwoven fabric impregnated with a resin is not also preferable since the binder resin is dropped or the fibers are dropped because of outside force during pleating or repetitive use of a filter, although the rigidity is improved. Regarding the spunbonded nonwoven fabric, a needle-punched nonwoven fabric is not preferable since the rigidity is low and further the filtration performance is lowered due to the perforation of needle-punching. A spunbonded nonwoven fabric impregnated with a resin is not preferable since the binder resin is dropped because of outside force during pleating or repetitive use of a filter.

The filament constituting the spunbonded nonwoven fabric of the present invention has a birefringence of preferably 0.04 to 0.09, more preferably 0.045 to 0.08, and further preferably 0.05 to 0.07. If the birefringence is lower than 0.04, the fiber tend to be thermally deformed and fiber fusion is promoted by embossing, but the fiber is inferior in rigidity and deteriorated in pleat retention property, and if thermally molded into a filter, the fiber becomes brittle and is inferior in durability and therefore, it is not preferable. If the birefringence is more than 0.09, the rigidity is heightened, but the followability during deformation is lowered and the pleatability is worsened and therefore, it is not preferable.

The filament constituting the spunbonded nonwoven fabric of the present invention has a fineness of preferably 1 to 5 dtex, more preferably 1.2 to 4 dtex, and further preferably 1.5 to 3 dtex. If the fineness is lower than 1 dtex, since the fiber is thin, the strength of the fiber itself is low and the wear resistance as a nonwoven fabric is inferior and therefore, it is not preferable. If the fineness is more than 5 dtex, a gap among the fibers constituting the nonwoven fabric becomes wide and the collection performance of dust small in size is lowered and therefore, it is not preferable.

A filter base material obtained by using the spunbonded nonwoven fabric of the present invention is preferable to have filtration performance so sufficient as to simultaneously satisfy that the collection efficiency for particles having a size of 0.3 μm or more and 0.5 μm or less is 25% or more and the QF value is 0.03 mmAq$^{-1}$ or more. In the present invention, in order to retain the function of a medium efficiency filter, the collection efficiency for particles having a size of 0.3 to 0.5 μm or less, as lithometeor collection efficiency, is 25% or more, preferably 30% or more, and further preferably 35% or more.

The filter base material obtained by using the spunbonded nonwoven fabric of the present invention is preferable to have a QF value of 0.03 mmAq$^{-1}$ or more in order to limit the filter performance based on the relationship of the collection performance and the pressure loss. It is more preferably 0.04 mmAq$^{-1}$ or more, and further preferably 0.05 mmAq$^{-1}$. If the QF value is lower than 0.03 mmAq$^{-1}$, there are cases where the pressure loss is high even when the collection efficiency is high, and where the collection efficiency is low even when the pressure loss is low and therefore, it is not preferable for the filter performance. The upper limit of the QF value is not particularly limited, but the QF value generally has a limit value of 0.09 mmAq$^{-1}$ and therefore, the upper limit is set to 0.09 mmAq$^{-1}$.

The filter base material obtained by using the spunbonded nonwoven fabric of the present invention can provide a filter with a long life by widening the filtration surface area per a prescribed cross sectional surface area in order to increase the filtration amount by pleating. The publicly-known shapes can be employed as the shape of pleat without any particular limitation, but the cross sectional surface area is preferably at least 2 times, more preferably at least 2.5 times, and furthermore preferably at least 3 times as wide as the cross sectional surface area of a flat surface. A folding shape is desirably a zigzag shape or a curved shape because of the easiness of shape processing and the shape retention property.

In the case where the filter base material obtained by using the spunbonded nonwoven fabric of the present invention is used as a high performance filter, it is preferable to integrate the filter base material with a high performance filter base material such as a high performance membrane, followed by subjecting the integrated material to pleating.

A publicly-known filter structure can be employed for the filter obtained by using the filter base material made of the spunbonded nonwoven fabric of the present invention.

EXAMPLES

Hereinafter, the present invention will be described more specifically with reference to examples; however the present invention is not limited thereto. In the examples, the respective property values were measured by the following methods.

<Glass Transition Temperature and Melting Point>

When 5 mg of each thermoplastic resin was prepared as a sample and heated at 10° C./minute from 20° C. to 290° C. in a nitrogen atmosphere by a differential scanning thermometer (Q100 manufactured by TA instruments), the peak temperature of heat generation was defined as a glass transition temperature and the peak temperature of heat absorption was defined as a melting point for evaluation.

<Basis Weight of Nonwoven Fabric>

The basis weight is indicated as a mass per unit surface area (1 m$^2$) measured in accordance with JIS L 1906 (2000).

<Rigidity (Bending Repulsion) of Nonwoven Fabric>

The bending resistance measured in accordance with JIS L 1096 (1999) 8. 20. 1 A method is defined as the bending repulsion of a nonwoven fabric and the longitudinal bending resistance is defined as the longitudinal bending repulsion (mN) in the present invention.

<Tensile Strength of Nonwoven Fabric>

Three specimens of 5 cm width×20 cm length are obtained for each nonwoven fabric of 1 m width, and a load is applied at a gripping interval of 10 cm and an expanding speed of 20±1 cm/minute until each specimen is broken. The strength at the time of the maximum load for each specimen is defined as the tensile strength.

<Birefringence>

An average value of n=5 measured for single fibers taken out of a nonwoven fabric or a web found by retardation and fiber diameter measured by a polarizing microscope equipped with a Berek compensator was defined as the birefringence (Δn).

<Fineness>

Ten small samples are randomly obtained from each nonwoven fabric and 5 fibers for each sample, i.e., 50 fibers in total are arbitrarily selected and their thicknesses are measured by an optical microscope. Assuming that the cross section of each fiber is round, the thickness is defined as a fiber diameter. The fineness is calculated from the fiber diameter calculated by rounding off to the nearest whole number of the average value thereof and the density of the polymer.

<Pressure Loss of Filter Base Material>

Three samples having ϕ50 mm were taken out of an arbitrary part of each nonwoven fabric and the respective samples were set in a holder of a filtration apparatus and the pressure loss (mmAq) was determined when lithometeor was allowed to suck from the downstream side of the filter material sample at an air flow rate of 5 cm/second.

<Collection Efficiency of Filter Base Material for Dust Having Size of 0.3 μm or More and 0.5 μm or Less>

Three samples having ϕ50 mm were taken out of an arbitrary part of each nonwoven fabric and the respective samples were set in a holder of a filtration apparatus and lithometeor was allowed to suck from the downstream side of the filter material sample at an air flow rate of 5 cm/second until the suction air amount was 1 m³, and the dust having a size of 0.3 µm or more and 0.5 µm or less in the sucked lithometeor on the upstream side of the filter material was measured with a counter to determine the number of dust (D1), while the dust having a size of 0.3 µm or more and 0.5 µm or less, which passed through the filter material, in the sucked lithometeor was measured with a counter to determine the number of dust (D2), and the collection efficiency was calculated according to the following equation.

Collection efficiency of dust with size of 0.3 µm or more and 0.5 µm or less(%)=(1−$D2/D1$)×100

<QF Value of Filter Base Material>

An average pressure difference (ΔP: mmAq) between the upstream side and the downstream side of each filter material during measuring the above-mentioned collection efficiency is measured and the QF value is calculated according to the following equation.

QF value(1/mmAq)=−{ln(collection efficiency)/100}/(ΔP)

<Wear Resistance>

A nonwoven fabric for a filter base material was cut out and set in a Gakushin-type color fastness and rubbing tester manufactured by DAIEI KAGAKU SEIKI MFG Co., Ltd. in such a manner that the embossed surface of the nonwoven fabric faced on the surface for rubbing, and a wearing test with rubbing 100 times was performed in accordance with the method defined in JIS L-0847 by using a grey shirting No. 3 for rubbing. The degree of wearing on the surface was evaluated as follows by eye observation:

no wear on the surface: ⊙,
minutely fuzzed up and scratched: ○,
slightly to moderately fuzzed up and damaged; Δ, and
considerably fuzzed up and damaged: ×.

<Pleatability>

From a roll-shaped filter base material, a nonwoven fabric was supplied to a small type pleating apparatus at a rate of 5 m/minute, pleated with a folding width of 20 mm, and set at a heating plate treatment temperature of 120° C. in a compression state to obtain a pleated filter base material. The pleatability the pleated filter base material was judged by sensory evaluation, based on the pleat formation state and the operation state of the small type pleating apparatus:

⊙: no clogging of the small type pleating apparatus excellent pleat shape;
○: no clogging of the small type pleating apparatus and good pleat shape;
Δ: no clogging of the small type pleating apparatus and slightly loose pleat angle; and
×: the small type pleating apparatus was clogged or all no clogging with different pleat shape and abnormal shape.

<Durability of Filter>

A filter provided with a frame was prepared by fixing each pleated filter base material on a square frame having 500 mm square and 100 mm thickness with the end parts of the filter material bonded with an adhesive in a folding state so that the filtration surface area was 3 times as wide, and the filter provided with the frame was set in an 50° C. atmosphere with the pleated uneven surfaces facing up and down. A disk having φ200 mm and bearing a load was put on the center to apply a load of 19.6 N in total to the filter and kept for 24 hours and thereafter, the filter was released from the load, the temperature was turned back at room temperature, and the shape change was judged with eye observation:

⊙: shape change;
○: slight deformation;
Δ: considerable deformation; and
×: crushed.

<Compression Bonding Surface Area of Nonwoven Fabric>

The surface of each nonwoven fabric having 1 m² is sampled at 20 points and photographed at 500 magnification by SEM and the obtained photographs enlarged 1000 times are printed and the compression bonding parts are cut out to determine the surface area (Sp) of the compression bonding parts cut out. A ratio of Sp to the entire surface area (S0) is determined from the number of compression bonding parts per unit surface area (n=20).

$P=Sp \times n/S0$

Example 1

As an A component, 99 wt % of polyethylene terephthalate (PET) having a glass transition temperature of 67° C. and an intrinsic viscosity of 0.65, and 1.0 wt % of PLEXIGLAS HW55 (HW55) manufactured by Rohm GmbH & Co. KG and having a glass transition temperature of 122° C. as a B component were mixed and dried, and the mixture was subsequently melted and spun by a nozzle with a nozzle orifice of L/D 3.0 at a spinning temperature of 285° C. and a single hole discharge amount of 1.12 g/minute, the obtained yarns were taken up at a spinning speed of 4500 m/minute, and then shaken and dropped onto a net conveyor to obtain a web. Continuously, the web was pressed by a preliminary compression roller at 100° C. on the net to obtain a web made of filaments with a single fiber fineness of 2.5 dtex. Next, the web was subjected to embossing using a transversely elliptical emboss roller having a compression bonding surface area ratio of 18% and a flat metal roller at a heating temperature of 240° C. and a linear pressure of 120 kN/m to obtain a nonwoven fabric having a basis weight of 250 g/m². The evaluation results of the obtained web and nonwoven fabric are shown in Table 1-1.

Next, the obtained nonwoven fabric was pleated and the results of evaluations as a filter base material are shown in Table 1-1.

The filter base material of Example 1 which satisfied the requirements of the present invention retained excellent filtration performance and also retained filter functions excellent in rigidity, wear resistance, pleatability, and shape retention property, and a filter obtained by using the filter base material was also excellent in durability.

Example 2

A nonwoven fabric was obtained in the same manner as in Example 1, except that the basis weight of the nonwoven fabric was changed to 180 g/m². The evaluation results of the obtained web, nonwoven fabric, filter base material and filter are shown in Table 1-1.

The filter base material of Example 2 which satisfied the requirements of the present invention retained excellent filtration performance and also retained filter functions excellent in rigidity, wear resistance, pleatability, and shape retention property, and the filter obtained by using the filter base material was also excellent in durability.

Example 3

A nonwoven fabric was obtained in the same manner as in Example 1, except that the basis weight of the nonwoven fabric was changed to 350 g/m². The evaluation results of the obtained web, nonwoven fabric, filter base material and filter are shown in Table 1-1.

The filter base material of Example 3 which satisfied the requirements of the present invention retained excellent filtration performance and also retained filter functions excellent in rigidity, wear resistance, pleatability, and shape retention property, and the filter obtained by using the filter base material was also excellent in durability.

Example 4

A web, a nonwoven fabric, a filter base material, and a filter were obtained in the same manner as in Example 1, except that 99.5 wt % of PET as the A component and 0.5 wt % of PLEXIGLAS HW55 (HW55) manufactured by Rohm GmbH & Co. KG as the B component were used, and the embossing was performed at an embossing temperature of 255° C. and a linear pressure of 125 kN/m, and their evaluation results are shown in Table 1-1.

The filter base material of Example 4 which satisfied the requirements of the present invention retained excellent filtration performance and also retained filter functions excellent in rigidity, wear resistance, pleatability, and shape retention property, and the filter obtained by using the filter base material was also excellent in durability.

Example 5

A web, a nonwoven fabric, a filter base material, and a filter were obtained in the same manner as in Example 4, except that the single hole discharge amount was changed to 0.9 g/minute, the taking up speed was changed to 3600 m/minute, and the embossing temperature was changed to 195° C., and their evaluation results are shown in Table 1-1.

The filter base material of Example 5 which satisfied the requirements of the present invention retained excellent filtration performance and also retained filter functions excellent in rigidity, wear resistance, pleatability, and shape retention property, and the filter obtained by using the filter base material was also excellent in durability.

Comparative Example 1

A web, a nonwoven fabric, a filter base material, and a filter were obtained in the same manner as in Example 1, except that 100 wt % of PET was used, the spinning temperature was changed to 285° C., the embossing temperature was changed to 260° C., and the linear pressure was changed to 130 kN/m, and their evaluation results are shown in Table 1-2.

The filter base material of Comparative Example 1 which did not satisfy the requirements of the present invention had high birefringence of the constituent fibers and was inferior in pleatability due to insufficient fiber fusion by embossing, although retaining excellent filtration precision.

Comparative Example 2

A web, a nonwoven fabric, a filter base material, and a filter were obtained in the same manner as in Example 1, except that 94 wt % of PET as the A component and a resin obtained by adding 1 wt % of styrene (PS) having a glass transition temperature of 108° C. and a molecular weight of 250000 as the B component and 5 wt % of Adeka Stab PFR as a phosphorus-based flame retardant, kneading the mixture, followed by pelletization with a conventional method was used, the embossing temperature was changed to 135° C., and the linear pressure was changed to 110 kN/m, and their evaluation results are shown in Table 1-2.

The filter base material of Comparative Example 2 was a filter base material obtained by using a nonwoven fabric in which yarn breakage occurred during spinning (supposedly attributed to formation of branches of styrene by heat decomposition) and the shrinkage ratio was also high, and the filter material was inferior in filtration performance and shape retention property although the wear resistance was allowable, and the filter using the filter material was inferior in durability.

Comparative Example 3

A nonwoven fabric and a filter base material were obtained by needle-punching for a web prepared in the same manner as in Comparative Example 1 with the number of needles per square centimeter of 60, and then a filter was prepared, and their evaluation results are shown in Table 1-2.

Since an interlacing treatment was carried out, the nonwoven fabric of Comparative Example 3 is a bulky nonwoven fabric with low rigidity and had through holes due to the interlacing treatment. The filter base material using the nonwoven fabric was inferior in rigidity and also inferior in filtration performance, wear resistance and pleatability, and the filter using the filter base material was also inferior in durability.

Comparative Example 4

Spinning was carried out in the same manner as in Example 1, except that 4.0 wt % of PLEXIGLAS hw55 (hw55) manufactured by Rohm GmbH & Co. KG was mixed as the B component, but yarn breakage occurred significantly and it was not possible to obtain a normal web. Consequently, the performance evaluation of a filter base material could not be carried out.

Comparative Example 5

A web, a nonwoven fabric, a filter base material, and a filter were obtained in the same manner as in Example 2, except that the basis weight was changed to 100 g/m², the embossing temperature was changed to 220° C., and the linear pressure was changed to 100 kN/m, and their evaluation results are shown in Table 1-2.

The filter base material of Comparative Example 5 is inferior in pleatability and durability since the basis weight is low and the rigidity is inferior.

Comparative Example 6

A web, a nonwoven fabric, a filter base material, and a filter were obtained in the same manner as in Example 2, except that the basis weight was changed to 450 g/m², and their evaluation results are shown in Table 1-2.

The filter base material of Comparative Example 6 is slightly inferior in pleatability since the basis weight is too high and the rigidity is high.

TABLE 1-1

|  | Experimental Example 1 | Experimental Example 2 | Experimental Example 3 | Experimental Example 4 | Experimental Example 5 |
|---|---|---|---|---|---|
| A component composition | PET | PET | PET | PET | PET |
| Melting point of A component: °C. | 265 | 265 | 265 | 265 | 265 |
| Resin used for fiber | blend | blend | blend | blend | blend |
| B component composition | HW55 | HW55 | HW55 | HW55 | HW55 |
| Glass transition temperature of B component: °C. | 122 | 122 | 122 | 122 | 122 |
| Additive amount of B component: mass % | 1.0 | 1.0 | 1.0 | 0.5 | 0.5 |
| Spinning temperature: °C. | 285 | 285 | 285 | 285 | 285 |
| Nozzle L/D | 3 | 3 | 3 | 3 | 3 |
| Fineness: dtex | 2.5 | 2.5 | 2.5 | 2.5 | 2.5 |
| Spinning speed: m/min | 4500 | 4500 | 4500 | 4500 | 3600 |
| Sppining state | good | good | good | good | good |
| Finer birefringence | 0.049 | 0.049 | 0.049 | 0.069 | 0.042 |
| Preliminary compression temperature: °C. | 100 | 100 | 100 | 100 | 100 |
| Processing treate | emboss | emboss | emboss | emboss | emboss |
| Embossing temperature: °C. | 240 | 240 | 240 | 255 | 195 |
| Emboss comperssion bonding surface area ratio: % | 15 | 15 | 15 | 15 | 15 |
| Basis weight: g/m² | 250 | 180 | 350 | 250 | 250 |
| Bending repulsion (longitudinal): mN | 38 | 25 | 58 | 40 | 35 |
| Bending repulsion (transverse): mN | 15 | 12 |  | 16 | 14 |
| Tensile strength (longitudinal): N/5 cm | 720 | 550 | 860 | 710 | 750 |
| 0.3 μm << 0.5 μm Particle collection efficiency: % | 35 | 26 | 70 | 36 | 30 |
| Pressure loss: mmAq | 8.6 | 6.0 | 15.0 | 8.2 | 8.7 |
| QF value: 1/mmAq | 0.05 | 0.05 | 0.08 | 0.054 | 0.041 |
| Wear resistance | ⊚ | ⊚ | ⊚ | ⊚ | ⊚ |
| Pleatability | ⊚ | ⊚ | ⊚ | ⊚ | ⊚ |
| Pleata durability | ⊚ | ⊚ | ⊚ | ⊚ | ○ |

TABLE 1-2

|  | Comparative Example 1 | Comparative Example 2 | Comparative Example 3 | Comparative Example 4 | Comparative Example 5 | Comparative Example 6 |
|---|---|---|---|---|---|---|
| A component composition | PET | PET | PET | PET | PET | PET |
| Melting point of A component: ?C. | 265 | 265 | 265 | 265 | 265 | 265 |
| Resin used for fiber | homopolymer | blend | homopolymer | blend | blend | blend |
| B component composition | none | PS | none | HW 55 | HW 55 | HW 55 |
| Glass transition temperature of B component: ?C. | — | 108 | — | 122 | 122 | 122 |
| Additive amount of B component: mass % | 0.0 | 1.0 | 0.0 | 4.0 | 0.5 | 0.5 |
| Spinning temperature: ?C. | 285 | 285 | 285 | 285 | 285 | 285 |
| Nozzle L/D | 3 | 3 | 3 | 3 | 3 | 3 |
| Fineness: dtex | 2.5 | 2.5 | 2.5 | 2.5 | 2.5 | 2.5 |
| Spinning speed: m/min | 4500 | 4500 | 4500 | 2000 | 4500 | 4500 |
| Sppining state | good | yarn breakage occurred | good | yarn breakage occurred significantly | good | good |
| Finer birefringence | 0.098 | 0.038 | 0.098 | — | 0.069 | 0.069 |
| Preliminary compression temperature: ?C. | 100 | 100 | 100 | — | 100 | 100 |
| Processing treate | emboss | emboss | needle punching | — | emboss | emboss |
| Embossing temperature: ?C. | 260 | 135 | — | — | 220 | 255 |
| Emboss comperssion bonding surface area ratio: % | 15 | 15 | — | — | 15 | 15 |
| Basis weight: g/m² | 250 | 250 | 250 | — | 100 | 450 |
| Bending repulsion (longitudinal): mN | 46 | 18 | 12 | — | 13 | 72 |
| Bending repulsion (transverse): mN | 18 | 9 | 8 | — | 7 | 31 |

TABLE 1-2-continued

|  | Comparative Example 1 | Comparative Example 2 | Comparative Example 3 | Comparative Example 4 | Comparative Example 5 | Comparative Example 6 |
|---|---|---|---|---|---|---|
| Tensile strength (longitudinal): N/5 cm | 380 | 400 | 800 | — | 350 | 980 |
| 0.3 µm << 0.5 µm Particle collection efficiency: % | 26 | 21 | 12 | — | 23 | 42 |
| Pressure loss: mmAq | 9.1 | 10.3 | 3.8 | — | 4.9 | 11.1 |
| QF value: 1/mmAq | 0.033 | 0.023 | 0.034 | — | 0.053 | 0.049 |
| Wear resistance | ⊚ | ◯ | X | — | ⊚ | ⊚ |
| Pleatability | X | Δ | X | — | Δ | Δ |
| Pleata durability | X | X | Δ | — | X | ⊚ |

INDUSTRIAL APPLICABILITY

The spunbonded nonwoven fabric obtained according to the present invention is a spunbonded nonwoven fabric that comprises single-component polyester-based fibers and is obtained by fiber fusion through a thermocompression bonding technique without treatment of interlacing fibers and can be provided more economically than other production methods. The spunbonded nonwoven fabric has high bending repulsion and is excellent in shape stability and durability and is particularly useful when being used for a filter base material.

The invention claimed is:

1. A spunbonded nonwoven fabric having
a basis weight of 150 to 400 g/m$^2$,
a longitudinal bending repulsion of 20 to 60 mN, and
a longitudinal tensile strength of 400 N/5 cm or more,
wherein the spunbonded nonwoven fabric comprises single-component polyester-based fibers.

2. The spunbonded nonwoven fabric according to claim 1, wherein the polyester-based fibers are fibers made of a mixture containing 98.0 to 99.95% by weight of a polyester-based resin (A component) having a glass transition temperature of 60° C. or higher and 0.05 to 2.0 wt % of a thermoplastic resin (B component) incompatible with the polyester-based resin (A component) and having a glass transition temperature of 120° C. to 160° C.

3. The spunbonded nonwoven fabric according to claim 2, wherein the A component is polyethylene terephthalate and the B component is a styrene-methyl methacrylate-maleic anhydride copolymer or a styrene-maleic acid copolymer.

4. The spunbonded nonwoven fabric according to claim 1, wherein the fibers constituting the nonwoven fabric are filaments each having a birefringence of 0.04 to 0.09 and a fineness of 1 to 5 dtex.

5. A filter base material comprising the spunbonded nonwoven fabric according to claim 1.

6. A filter base material comprising the spunbonded nonwoven fabric according to claim 1, wherein the filter base material has a collection efficiency of 25% or more for particles with a size of 0.3 µm or more and 0.3 µm or less and a QF value of 0.03 mmAq$^{-1}$ or more, regarding a filtration property when being used in the form of a nonwoven fiber single-plate.

7. The filter base material according to claim 5, wherein the filter base material is subjected to pleating.

8. The filter base material according to claim 6, wherein the filter base material is subjected to pleating.

9. The spunbonded nonwoven fabric according to claim 2, wherein the fibers constituting the nonwoven fabric are filaments each having a birefringence of 0.04 to 0.09 and a fineness of 1 to 5 dtex.

10. The spunbonded nonwoven fabric according to claim 3, wherein the fibers constituting the nonwoven fabric are filaments each having a birefringence of 0.04 to 0.09 and a fineness of 1 to 5 dtex.

11. A filter comprising the filter base material according to claim 5.

12. A filter comprising the filter base material according to claim 6.

13. A filter comprising the filter base material according to claim 7.

14. A filter comprising the filter base material according to claim 8.

15. The spunbonded nonwoven fabric according to claim 1, wherein the single-component polyester-based fibers are obtained by a process comprising melting and spinning a mixture containing a polyester-based resin (A component) having a glass transition temperature of 60° C. or higher and a thermoplastic resin (B component) incompatible with the polyester-based resin (A component) and having a glass transition temperature of 120° C. to 160° C. to form a web.

16. The spunbonded nonwoven fabric according to claim 15, wherein the process further comprises compressing the web with a compression roller and embossing the web with an embossing roller and a flat metal roller.

* * * * *